United States Patent
Mulkar et al.

(10) Patent No.: US 11,924,110 B2
(45) Date of Patent: Mar. 5, 2024

(54) SYSTEM AND METHOD FOR PRIORITIZING NETWORK TRAFFIC IN A DISTRIBUTED ENVIRONMENT

(71) Applicant: Sandvine Corporation, Waterloo (CA)

(72) Inventors: Tushar Mulkar, Karnataka (IN); Nilanjan Sarkar, Karnataka (IN); Anchal Srivastava, Uttar Pradesh (IN)

(\*) Notice: Subject to any disclaimer, the term of this patent is extended or adjusted under 35 U.S.C. 154(b) by 0 days.

(21) Appl. No.: 17/864,925

(22) Filed: Jul. 14, 2022

(65) Prior Publication Data
US 2023/0040411 A1    Feb. 9, 2023

(30) Foreign Application Priority Data

Jul. 15, 2021 (IN) .............................. 202111031831
Aug. 27, 2021 (IN) .............................. 202111038938
Jul. 13, 2022 (EP) ....................................... 2218466

(51) Int. Cl.
*H04L 47/22* (2022.01)
*H04L 47/2425* (2022.01)
(Continued)

(52) U.S. Cl.
CPC .......... *H04L 47/22* (2013.01); *H04L 47/2433* (2013.01); *H04L 47/2441* (2013.01);
(Continued)

(58) Field of Classification Search
None
See application file for complete search history.

(56) References Cited

U.S. PATENT DOCUMENTS

| | | | |
|---|---|---|---|
| 8,509,074 B1 * | 8/2013 | Roberts | H04L 43/16 370/232 |
| 2002/0186661 A1 * | 12/2002 | Santiago | H04L 47/10 370/386 |

(Continued)

FOREIGN PATENT DOCUMENTS

| | | |
|---|---|---|
| EP | 3633939 A1 | 4/2020 |
| WO | 2006108282 A1 | 10/2006 |

OTHER PUBLICATIONS

Extended European Search Report, European Patent Office, on EP Application No. 22184661.1, dated Nov. 24, 2022.
(Continued)

*Primary Examiner* — Anh Ngoc M Nguyen
(74) *Attorney, Agent, or Firm* — Amarok IP Inc.; Neil W. Henderson

(57) ABSTRACT

A system and method for prioritizing network traffic in a distributed environment. The system includes: a plurality of logic modules configured to receive policy data from a network device; a control processor associated with each logic module, each control processor configured to determine data associated with a traffic flow and coordinate traffic actions over the plurality of logic modules; a packet processor associated with each control processor and configured to determine a traffic action based on the traffic flow and received policy data; and at least one shaper object configured to enforce the determined traffic action. The method includes: receiving policy data from a network device; determining data associated with a traffic flow at logic modules to coordinate traffic actions of the logic modules; determining a traffic action based on the traffic flow and received policy data; and enforcing the traffic action across at least one shaper object.

14 Claims, 9 Drawing Sheets

(51) Int. Cl.
    *H04L 47/2441* (2022.01)
    *H04L 47/2483* (2022.01)
    *H04L 47/40* (2022.01)
    *H04L 47/52* (2022.01)

(52) U.S. Cl.
    CPC .......... *H04L 47/2483* (2013.01); *H04L 47/40* (2013.01); *H04L 47/52* (2013.01)

(56) References Cited

U.S. PATENT DOCUMENTS

| | | |
|---|---|---|
| 2010/0208587 A1 | 8/2010 | Landry et al. |
| 2015/0350083 A1 | 12/2015 | Goodson et al. |
| 2019/0158371 A1 | 5/2019 | Dillon et al. |
| 2020/0112483 A1 | 4/2020 | Sridhar et al. |

OTHER PUBLICATIONS

Extended European Search Report, European Patent Office, on EP Application No. 22184678.5, dated Nov. 25, 2022.
Extended European Search Report, European Patent Office, on EP Application No. 22192287.5, dated Jan. 4, 2023.

\* cited by examiner

SYSTEM AND METHOD FOR PRIORITIZING NETWORK TRAFFIC IN A DISTRIBUTED ENVIRONMENT

RELATED APPLICATIONS

The present disclosure claims priority to Indian Provisional Application No. 202111031831 filed Jul. 15, 2021, and to Indian Provisional Application No. 202111038938 filed Aug. 27, 2021, and European Patent Application 2218466.1 filed Jul. 13, 2022 all of which are hereby incorporated in their entirety.

FIELD

The present disclosure relates generally to computer network traffic. More particularly, the present disclosure relates to a system and method for prioritizing network traffic, for example, via shaping, in a distributed environment.

BACKGROUND

Network operators, internet service providers (ISP), or the like (generally "ISP"), may operate or use a variety of computer networks, for example, cable or wireless (4G, 5G, or the like) and will generally have a finite amount of bandwidth available. The subscribers registered with the ISP generally share this bandwidth in various ways. When the sum total of bandwidths used by all the subscribers is within the limit of the bandwidth provided by the ISP, the quality of service and experience on applications is not impacted due to limited bandwidth available in the ISP network(s). However, when the sum total of bandwidth required by subscribers exceeds the bandwidth available to the ISP, the quality of experience on applications by subscribers may suffer depending on type of application. Under these conditions, the network can become congested as the demand for traffic is higher than the bandwidth available.

A subscriber running background traffic (for example, bit torrent, file download, or the like) may be more tolerant to lower available bandwidth, but a subscriber doing a video call or streaming video may notice degradation in quality of experience very quickly. This is one of the reasons to distinguish between quality of service (QoS) and quality of experience (QoE). Even though an ISP may want to provide as much bandwidth as subscribers' desire, it comes with a cost. Therefore, bandwidth shaping is often applied on the network traffic to limit the amount of bandwidth utilized by an individual subscriber and/or group of subscribers and/or specific application(s) or the like based on different criteria to optimize QoE or QoS depending on operator deployment choice. Prioritized or optimized use of bandwidth, dividing shared bandwidth among each subscriber/group of subscribers and giving preference to priority traffic during bandwidth calculation are a few examples of dividing bandwidth among subscribers.

However, conventional methods of working with bandwidth encounter various issues. It is therefore desirable to provide an improved method and system for prioritizing (for example, via shaping) network traffic in a distributed environment.

The above information is presented as background information only to assist with an understanding of the present disclosure. No determination has been made, and no assertion is made, as to whether any of the above might be applicable as prior art with regard to the present disclosure.

SUMMARY

In a first aspect, there is provided a system for prioritizing network traffic in a distributed environment, the system includes: a plurality of logic modules configured to receive policy data from a network device; a control processor associated with each one of the plurality logic modules, each control processor configured to determine data associated with a traffic flow at the associated logic module and to coordinate traffic actions over the plurality of logic modules; a packet processor associated with each control processor and configured to determine a traffic action based on the traffic flow and received policy data; and at least one shaper object associated with the packet processor and configured to enforce the determined traffic action by the packet processor.

In some cases, the control processor may be configured to determine the priority of each traffic flow of a plurality of traffic flows.

In some cases, available bandwidth may be allocated across the at least one shaper object based on the priority of the traffic flows.

In some cases, priority level may be provided a weight of the available bandwidth across the at least one shaper instance.

In some cases, each priority level may be assigned a weight greater than zero.

In some cases, if a priority level does not consume the complete bandwidth provided by the weight, the weight is redistributed.

In some cases, the system may further include at least one traffic classification engine configured to classify the traffic flow based on traffic parameters.

In some cases, each of the plurality of logic modules may receive various priority levels of traffic flow.

In some cases, each of the plurality of logic modules may receive traffic flow of equal priority levels.

In some cases, each control processor may be configured to coordinate traffic actions over a sync interval and share the coordinated traffic actions with each control processor associated with each of the plurality of logic modules.

In another aspect, there is provided a method for prioritizing network traffic in a distributed environment, the method including: receiving policy data from a network device; determining data associated with a traffic flow at each of a plurality of logic modules to coordinate traffic actions over the plurality of logic modules; determining a traffic action based on the traffic flow and received policy data; and enforcing the determined traffic action across at least one shaper object associated with each of the plurality of logic modules.

In some cases, the method may further include determining a priority level of each traffic flow of a plurality of traffic flows.

In some cases, available bandwidth may be allocated across the at least one shaper object based on the priority level of the traffic flow.

In some cases, the priority level of each traffic flow may be provided a weight of the available bandwidth across the at least one shaper object instance.

In some cases, the priority level of each traffic flow may be assigned a weight greater than zero.

In some cases, if any priority level of each traffic flow does not consume the complete bandwidth provided by the weight, the weight may be redistributed.

In some cases, the method may further include classifying each traffic flow based on traffic parameters.

In some cases, each of the plurality of logic modules may receive various priority levels of traffic flow.

In some cases, each of the plurality of logic modules may receive traffic flows of equal priority levels.

In some cases, the method may further include coordinating traffic actions over a sync interval; and sharing the coordinated traffic actions with each control processor associated with each of the plurality of logic modules.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

DETAILED DESCRIPTION

Figure 1:
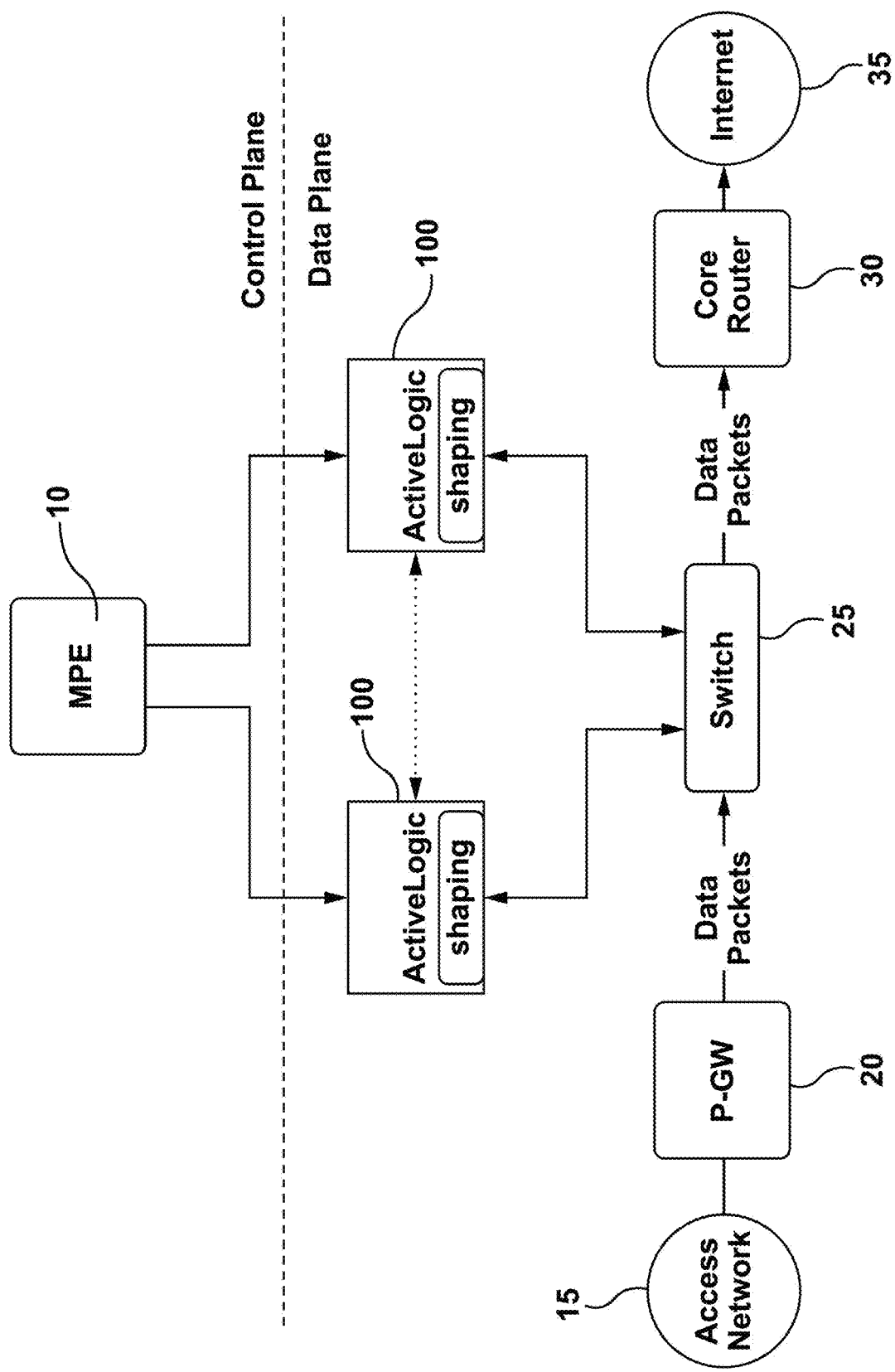
FIG. 1 illustrates an environment for a system for prioritizing network traffic according to an embodiment.

Generally, the present disclosure provides a method and system for prioritizing network traffic via shaping over a plurality of distributed nodes. In particular, shaping or traffic prioritization may occur over more than one system in a network. Embodiments of the system and method detailed herein are intended to monitor traffic flow and coordinate shaping of the traffic flow based on priority of the traffic over distributed systems. In some cases, the system may determine traffic flow data for the traffic flow received at each of the nodes within the distributed system. Each node may communicate with each of the other nodes at a predetermined synchronization interval, which may include "real time" to determine the overall makeup of the traffic flow. Each node, based on the overall traffic flow, can then be configured to shape and prioritize the traffic flow through the node in conjunction with the traffic flowing through the other nodes.

It will be understood that there may be difficulties and benefits to provide shaping in a distributed environment ("distributed shaping"). Whereas Quality of Service (QoS) based shaping may generally provide a fairer share of bandwidth, it may not always provide a fair share of Quality of Experience (QoE). For example, if all subscriber's bandwidth is reduced by 10%, Video call users may have visibly bad experience compared to file download users who may not notice the downgrade as much. An ISP may be able to provide better QoE by providing more bandwidth, but additional bandwidth comes with an associated cost. The network bandwidth can be used in a more optimal way if QoE is taken into consideration during prioritization with the goal that, during congestion, the QoE of subscribers for each application or category of application (for example, social, streaming, real time, and the like) is kept at a predetermined level that is considered to be good or within an acceptable limit of degradation.

In some case, embodiments of the system and method provided herein are intended to prioritize certain types of traffic over others, shaping can be performed in a distributed manner such that traffic tagged with certain priority is given precedence over other lower priority traffic. Bandwidth is allotted to traffic tagged with higher priority when demanded but if the demand for bandwidth of higher priority traffic is low, spare bandwidth can be allotted to lower priority traffic. Such type of shaping is referred to as Priority Shaping. Further in order to make sure that lower priority traffic does not starve due to high load of priority traffic, weights can be assigned to priorities and allow for minimum guaranteed bandwidth to each priority traffic. This process is generally referred to as Weighted Fair Queue shaping.

In a non-distributed environment, Shaper Objects, sometimes referred to as shapers, are generally aware of the total available bandwidth, traffic for different priorities and their respective bandwidth demands. In this case, Shaper Objects are intended to iterate over all the priorities and allocate available bandwidth to traffic in the order of precedence of priority and corresponding demand. In conventional distributed environments, Shaper Objects tend to operate individually, in that each Shaper will be provided with a portion of the overall bandwidth and will shape the traffic which flows through the Shaper Object based on the portion of the bandwidth.

FIG. 1 illustrates an environment for an embodiment of the distributed system 100 detailed herein. As seen in FIG. 1, network traffic flows from an access network 15, through a packet gateway 20 to a switch 25. The switch 25 may then route traffic to and from the distributed system 100 based on the network configuration. The distributed system 100 includes one or more logic modules, which is operatively connected with a Policy Engine (PE 10). The PE 10 may be a control plane element with knowledge of subscriber mapping to traffic flows and may also provision shaper parameters to the system. The prioritized and shaped traffic is then sent to the core router 30 and the Internet 35. It will be understood that traffic flowing from the Internet 35 to the Access Network 15 will generally traverse the same elements in opposite order.

Figure 2:
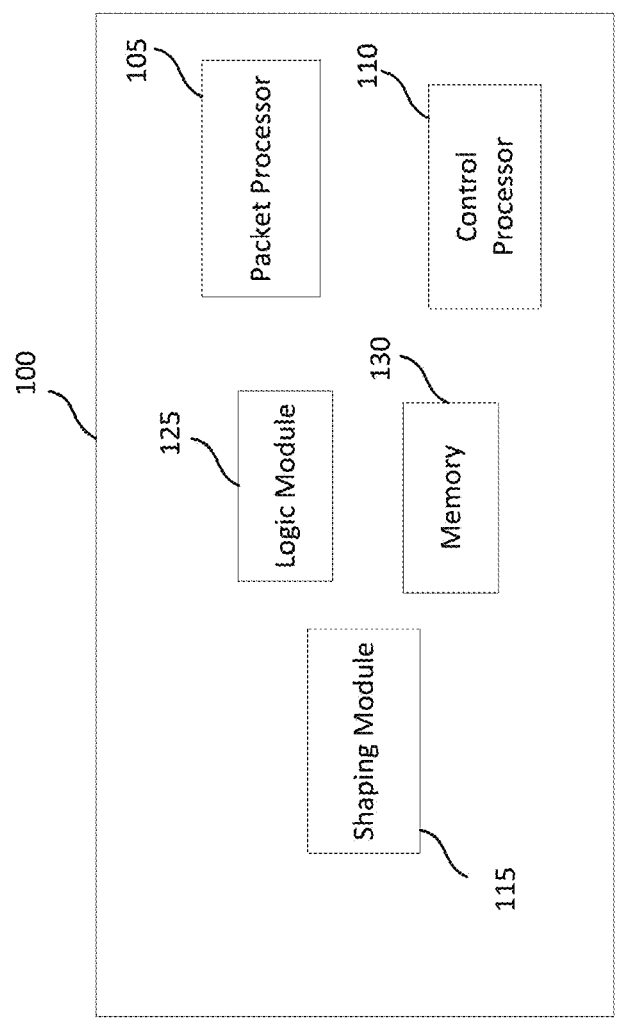
FIG. 2 illustrates a system for prioritizing network traffic via distributed shaping according to an embodiment.

FIG. 2 illustrates an embodiment of an element of a distributed system 100 for prioritizing network traffic in a distributed environment. As detailed herein, embodiments of the system 100 are intended to include a Logic module. The Logic module may be an inline data plane element responsible for shaping traffic appropriately based on operator policies and product configuration.

FIG. 2 illustrates an embodiment of an element of a distributed system 100 for prioritizing network traffic in a distributed environment. As detailed herein, embodiments of the system 100 are intended to include a Logic module, which is operatively connected with a Policy Engine (PE 10). The Logic module may be an inline data plane element responsible for shaping traffic appropriately based on operator policies and product, configuration. The PE 10 may be a control plane element with knowledge of subscriber mapping to traffic flows and may also provision shaper parameters to the system.

In the case of a distributed environment, there may be a plurality of Logic module nodes in a distributed manner. A set of N Logic module nodes (sometimes call logic modules or logic nodes) serving traffic and performing shaping in the network, is generally referred to as a cluster. Available bandwidth is distributed to individual Logic nodes and each Logic node allocates their share or the bandwidth to traffic processed by them. To achieve the behavior of Priority Shaping and Weighted Fair Queue Shaping as explained above, it is important to have correct distribution of the available bandwidth among the Logic nodes in the cluster.

Embodiments of the method detailed herein are intended to achieve priority and weighted fair queue shaping in a cluster/network, such that across the cluster/network each priority traffic flow is intended to receive a share of the bandwidth according to weights assigned to the cluster/network. If no weights are assigned, then demands are fulfilled according to precedence of priority.

As noted above, FIG. 2 illustrates an embodiment of a distributed system 100 for prioritizing network traffic in a distributed environment. The system includes a packet processor 105, a control processor 110, a shaping module 115, a logic module 125 and at least, one memory component 125. The system may include a plurality of distributed systems 100, each having its own similar modules and components. The system is generally intended to be distributed and reside in the data plane. The processor may be configured to execute the instructions stored in the memory component in order for the modules to execute their functions. The system 100 is intended to receive information from the computer network equipment that allows the system to determine policy rules and prioritization rules for the network.

The Logic node or Logic module 125 refers to an entity that receives packets from the traffic flow, identifies the appropriate shaper object traffic should be subjected to. Once shaping is performed, the Logic module shapes or drops the packets according to a shaping result.

The Shaper module 115 or Shaper object is a logical entity that holds the information required to perform shaping on the traffic received. This information includes, for example, bandwidth available per priority, bandwidth utilized per priority, and the like. Each element of the system may have at least one Shaper module 115, sometimes referred to as a Shaper instance. A plurality of shaper instances form a distributed shaper.

The Packet Processor 105 may be associated with the Logic module 125 and is configured to provide the instructions for shaping and transmitting the traffic. The Shaper module 115 associated with the Packet Processor 105 collects the statistics regarding per priority traffic received and transmitted for an interval, which is shared with the Control Processor 110 periodically. At this interval, the Shaper Object 115 may also be informed about how much bandwidth can be used for next interval. In some cases, the Packet Processor 105 may also include a Traffic Classification Engine (not shown). The Traffic Classification Engine is configured to classify traffic, for example, by application. In some cases, the Packet Processor is configured to determine or retrieve shaping rules based on the traffic classification type.

The Control Processor 110 may generally refer to a processing module that determines the available bandwidth for shaper objects within the current node based on the information received from the Packet Processor 105 and other Control Processors 110 in the cluster. It also sends the local information to all the other Control Processors 110 operating in the cluster. It is intended to operate the Logic module 125 of the system in connection with the Packet Processor 105.

A Sync Interval is intended to be a predetermined interval in, for example, milliseconds or as appropriate, within which, the Control Processor 110 associated with a Logic node 125 communicates the information about traffic flow data to the Control Processors 110 of other Logic modules 125 in the cluster. This traffic flow data is intended to be used to determine bandwidth to be utilized by each shaper object locally. The Sync Interval may be preconfigured in each of the nodes in the cluster. The Sync interval is generally intended to be the same in each node.

Figure 3:
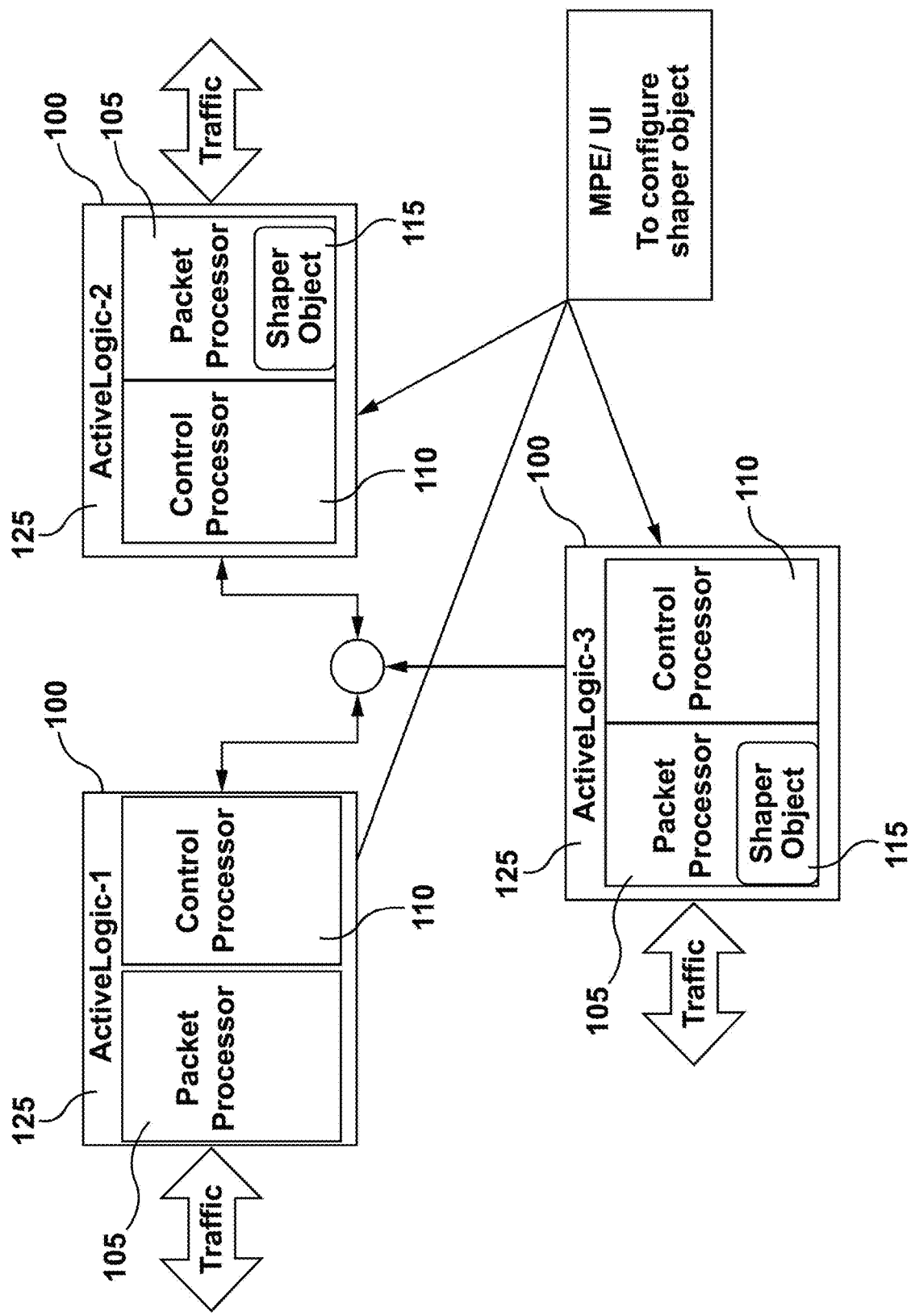
FIG. 3 illustrates an environment illustrating a plurality of systems for prioritizing network traffic via distributed shaping according to an embodiment.

FIG. 3 illustrates a system diagram showing distributed network nodes. Each Logic module 125 may include or be operatively connected to at least one Data Processor 105 and at least one Control Processor 110. In some cases, a user or ISP may configure a shaping object with desired expected behavior (for example: a rate at which traffic to be shaped, weights per priority, rules to identify traffic that should be subjected to Shaper Object 115, or the like). This configuration may be parsed by the at least one Control Processor 110 and sent to the at least one Packet Processor 105.

The Packet Processor 105, when it receives traffic, can assign priority to the traffic based on the rules configured by the control plane or policy engine, and selects at least one Shaper Module 115 that should shape the traffic. The selected Shaper Module 115 may be allocated with bandwidth to spare in an interval. The Shaper Module 115 can be configured to maintain queues per priority and incoming traffic is queued in respective priority buckets. The Shaping Module 115 periodically drains the queues starting from the highest priority and allocates the available bandwidth. Once an interval is over the traffic data, for example, the amount and priority of the traffic and other traffic statistics, collected by shaper objects are passed to the Control Processor 110. The Control Processor 110 then propagates this data to all the nodes in the cluster. The Control Processor 110 may aggregate the information received locally as well as received from the other system in the distributed environment to determine bandwidth that can be allocated by local Shaper objects 115 per priority and update the Shaper object 115 via the Packet Processor 105.

In some cases, the traffic statistics collected may be, for example, per priority traffic demand in that node over an interval for the Shaping object, per priority used bytes in the node over the interval for the shaping object. In some cases, other traffic statistics, for example, application type, subscriber details or the like, may also be determined and collected.

Figure 4:
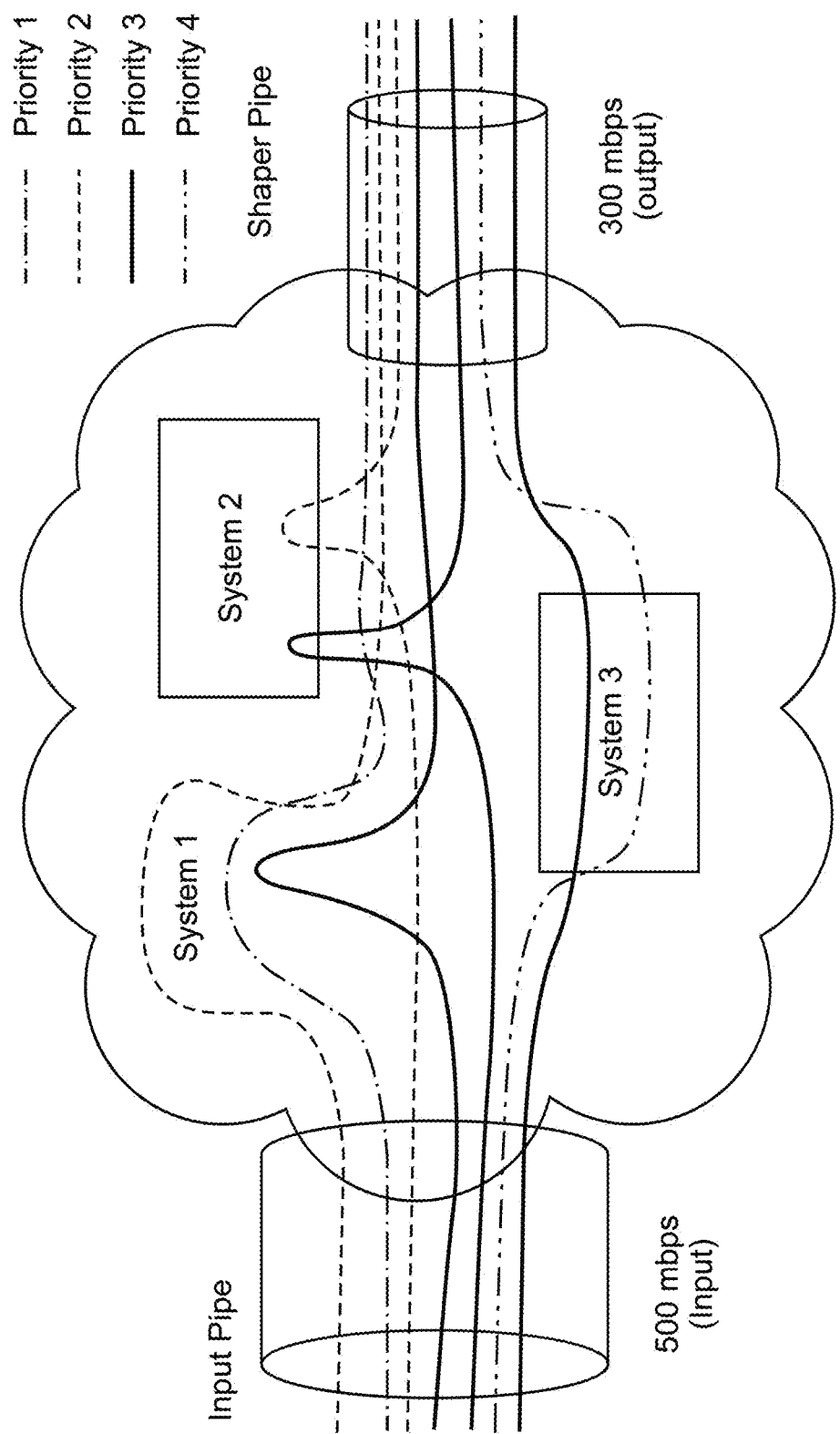
FIG. 4 illustrates traffic flow through a plurality of distributed shapers.

FIG. 4 illustrates an example of a shaping module in a distributed environment. Various different input traffic of varying priorities may be received at each distributed system. Embodiments of the system and method are intended to output the traffic and subject it to an appropriate shaper object. As can be seen from FIG. 4, traffic flows of the same priority may flow through various nodes of the system, such that more than one node in a cluster may see the same priority traffic.

In a particular example, the system may be configured to shape traffic at the rate of 300 Mbps and may operate in a cluster with 3 systems for distributed shaping, which implies that the cluster will allow a maximum 300 Mbps traffic at any given point of time. If the input is more than 300 Mbps, for example 500 Mbps, the remaining 200 Mbps traffic may be dropped in a conventional solution. Further, in a conventional solution, each shaper instance may be configured to shape its local input, based on its locally received traffic priority. This conventional solution may not provide appropriate priority traffic flow as a whole as each shaper object only reviews the local data. In particular, Shaper instance 1 (S1): 250 Mbps (P1 150, P2, 50, P3 50) 50%, while, Shaper instance 2 (S2): 140 Mbps (P2 80, P3 60) 28% and Shaper instance 3 (S3): 110 Mbps (P3 10, P4 100) 22%. In a conventional system the bandwidth will be divided based on total input demand per system (without considering priority view in cluster level). Therefore, for the above example, S1: 50% of 300==150 Mbps (P1=150, P2=0, P3=0)
S2: 28% of 300==84 Mbps (P2=80, P3=4)
S3: 22% of 300==66 Mbps (P3=10, P4=56)

It can be seen, that in a conventional solution, the shaper objects may drop P2 traffic while allowing P3 and P4 traffic.

Embodiments of the system and method are intended to review all the traffic priority to allow for higher traffic priority to flow with less shaping than lower priority traffic. In this example, traffic may be categorized in 4 priorities, and the traffic is received at each node as per following description:

Shaping bandwidth: 300 mbps
Incoming traffic at system 1—Traffic P1 with 150 mbps, Traffic P2 with 50 mbps, Traffic P3 with 50 mpbs
Incoming traffic at system 2—Traffic P2 with 80 mbps and Traffic at P3 with 60 mbps
Incoming traffic at system 3—Traffic P3 at with 10 mbps and traffic P4 with 100 mpbs.

Generally, the expected result may be in the cluster the system detects 150 Mbps Priority 1 traffic (in system 1), 130 Mbps Priority 2 traffic (in system 1 and system 2), 120 Mbps priority 3 traffic (in system 1, system 2 and system 3) and 100 mbps Priority 4 traffic (in Node C). Thus the overall input is seen as a total of 500 Mbps.

Figure 5:
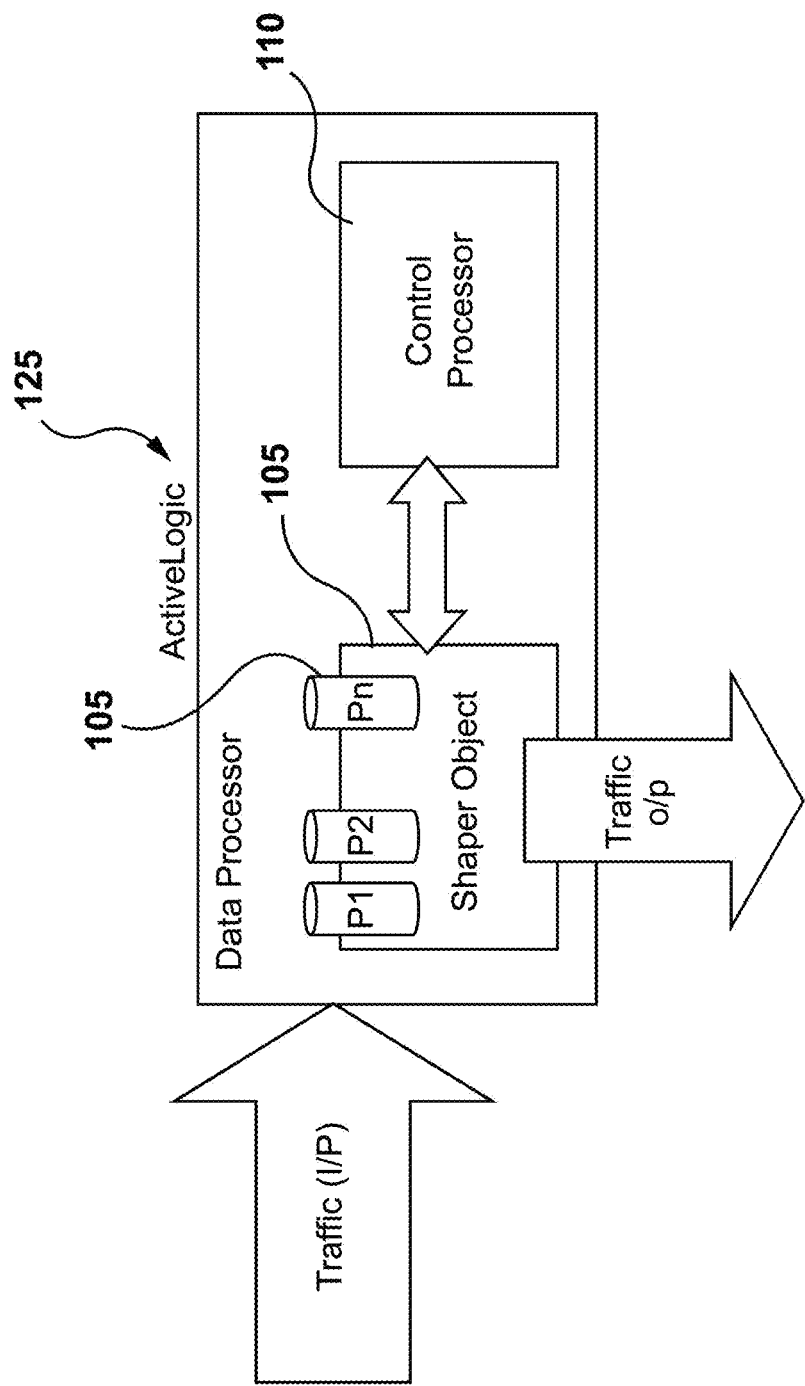
FIG. 5 illustrates a traffic flow through a system for prioritizing network traffic via distributed shaping according to an embodiment.

It will be understood that the bandwidth may be shared between system 1, system 2 and system 3 in the following manner:

Logic-1 module: (Total Output: 209 Mbps)
  Priority-1 traffic: Shaped at 150 mbps
  Priority-2 traffic: Shaped at 50 mbps
  Priority-3 traffic: Shaped at 9 mbps
  Drops: 41 Mbps
Logic-2 module: (Total Output: 91 Mbps)
  Priority-2 traffic: Shaped at 80 mbps
  Priority-3 traffic: Shaped at 11 mbps
  Drops: 49 Mbps
Logic-3 module: (Total Output: 0 Mbps)
  Priority-3 traffic: 0 Mbps output
  Priority-4 traffic: 0 Mbps output FIG. 5 illustrates an example of traffic flow and processing at each system within the cluster. An Operator may initially configure the Shaper Object 115 to shape traffic at a certain rate using a policy engine (a control plane element) or a User Interface associated with at least one Logic module 125, or it may be preconfigured with various parameters. In some cases, the configurable parameters may be, for example: a rate at which traffic is to be shaped per second, per priority weights in percentage, the Sync Interval, rules to match the traffic that should be sent to each shaper object, rules to assign priority to the traffic that should be sent to shaper object, and the like.

Once the shaper is configured with initial parameters, the Control Processor 110 at, each system logic node sends the configuration to the Packet Processor 105. The Packet Processor 105 may create a logical entity for the Shaper Object 115 with the respective configuration. Once the Shaper Object 115 is created, the Packet Processor 105 may send matching traffic to the Shaper Object 115, which will perform the shaping.

The Sync Interval can be a configurable parameter, which can be fine-tuned to provide for accurate and/or varying results in various traffic conditions. If the traffic flow is relatively stable, a 1 second interval may be sufficient. On the other hand, if the traffic is constantly varying a more aggressive synchronization interval, for example, 100 millisecond may be used. It will be understood that this parameter may also be updated from time to time or in real-time based on the traffic conditions.

In some cases, there may be a Shaper Object without Weighted Fair Queue Configuration. If a shaper is configured without any weights per priority, by default the shaper object may be set to allocate all the bandwidth to highest priority traffic. If demand for highest priority traffic doesn't consume all the bandwidth, it will be consumed by second highest priority and so on.

Figure 6:
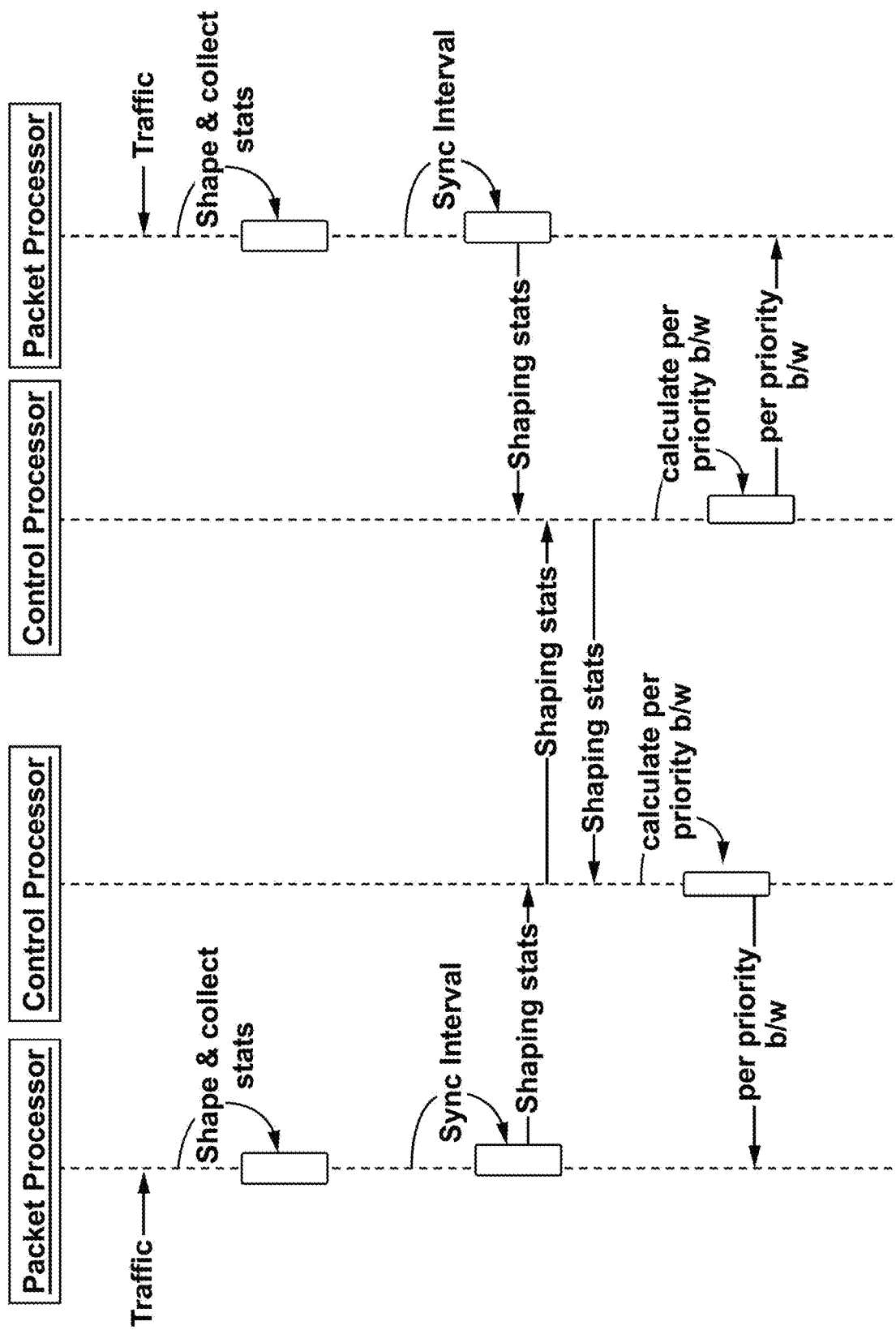
FIG. 6 illustrates a sequence diagram for a method for prioritizing network traffic via distributed shaping according to an embodiment.

FIG. 6 illustrates a sequence diagram of an embodiment of a method for shaping in a distributed environment. The Control Processor 110 may initially allocate 100% configured bandwidth to the Shaper Object 115 at each Logic module 125. When traffic is received at the Logic module, the Packet Processor 105 associated with the Logic Module is configured to parse the traffic. The Packet Processor 105 may determine if the traffic should be processed by a shaper object 115. If yes, then the packet processor 105 may further determine the priority of the traffic. Once the shaper object 115 and traffic priority is determined, the Packet Processor 105 may queue the packets to the respective priority queue of the identified shaper objects. The traffic priority may be determined based on a traffic classification engine and configured shaping rule. If, for example, there is a shaping rule to give video streaming traffic the highest priority, then if the traffic is classified as video streaming traffic from the traffic classification engine, then the shaping object will apply the shaping rule and mark that traffic as the highest priority and apply the highest priority rule. In some cases, the traffic classification engine may be part of the packet processer.

At every sync interval, the shaper object 115 may iterates through each priority queue in the order of precedence (highest priority to lowest priority) and may distribute the available bandwidth demanded by each until all priorities are traversed or the available bandwidth is fully consumed. During this process, the Logic module may determine demands per priority. At the end of the interval, the collected data may be sent to or retrieved by the Control Processor, for example, as follows where P is the $i^{th}$ priority statistics for the shaping object:

Message: Shaper_UtilizationDetails
From: Shaper Object
To: Control Processor
Contents:

| P1: demand | P2: demand | P3: demand | ... | ... | ... | Pn: demand |
|---|---|---|---|---|---|---|

The Control Processor 110 may be configured to have this information stored in a local memory component. The Control Processor 110 may also forward this information to all other Control Processor modules operating in Logic modules of the cluster over, for example, UDP protocol or the like. It is intended that each control processor 110 will then have traffic data for its associated logic module as well as traffic data for each of the other logic modules in the cluster.

For every Sync Interval, the Control processor 110 is configured to read and store the per priority demand received from all the Control Processors 110 in the cluster. Each Control Processor in the cluster may determine the bandwidth that can be allocated to a shaper object, which can be consumed until the end of the next Sync Interval. Each shaper object at each Packet Processor running at each of the plurality of Logic modules may be given a specific bandwidth allocation based on the priority of the traffic seen by the shaping object in the previous Sync Interval. The bandwidth per priority for the associated local Logic module may be sent to the Packet Processor 105 where the shaper object 115 will use them to shape the traffic:

Message: Shaper_Allocation_Details
From: Control Processor
To: Shaper Object
Contents:

| P1: Bandwidth | P2: Bandwidth | ... | ... | Pn: Bandwidth |
|---|---|---|---|---|

Figure 7:
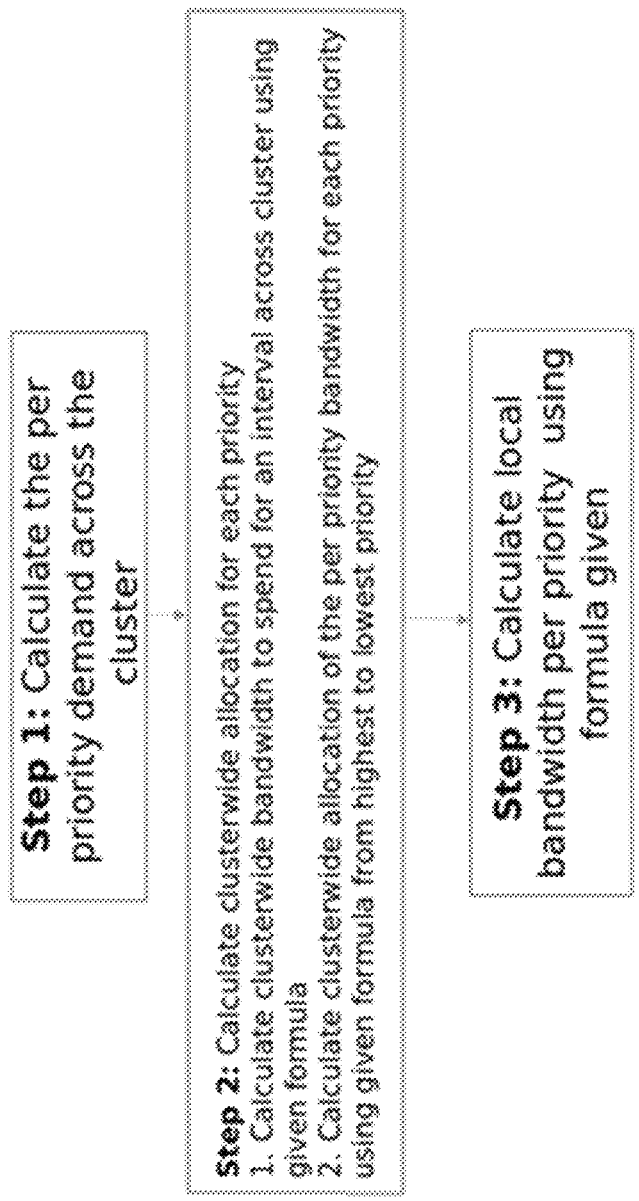
FIG. 7 is a flowchart for a method for prioritizing network traffic via distributed shaping according to an embodiment.

FIG. 7 illustrates a method for shaping in a distributing environment according to an embodiment. At 705, the system determines the per priority demand across the cluster by aggregating (for example, by summing) the traffic flow data received from each Logic module at each control processor 110. Each local shaper object is configured to determine and store traffic flow data including bandwidth requirements and priority level of traffic flows.

At 710, the Control processor is configured to determine a clusterwide allocation amount for each priority level. In particular, the control processor 110 may determine a clusterwide bandwidth to spend for an interval across cluster using for example: total_Interval_bw=(configured_bandwidth/1000)*interval. Further, a clusterwide allocation of the per priority bandwidth for each priority, from highest to lowest priority, using for example:

If (total_Interval_bw>clusterwide_priority_demand (determined at 705))
then
   priority_X_interval_bw=total_Interval_bw—clusterwide_priority_demand
   total_Interval_bw=total_Interval_bw−priority_interval_bw
else
   priority_X_interval_bw=total_Interval_bw At 715, each local control processor 110 may determine local bandwidth per priority using, for example: (local_demand_for_priority/total_demand_across_cluster)*priority_X_interval_bw. It will be understood that this may be the calculation when no weights have been assigned per priority. Each control processor 110 is configured to have the same traffic flow data and is configured in a similar manner in that each control processor 110 in a cluster will determine the flow per each local Logic node based on the overall distributed bandwidth and overall distributed traffic flow data.

Prediction at every Logic Control Processor
- Collect the per priority (P6i, P7i, P8i... ) input at local Node and send this information to each Node in thee cluster -continued

Figure 8:
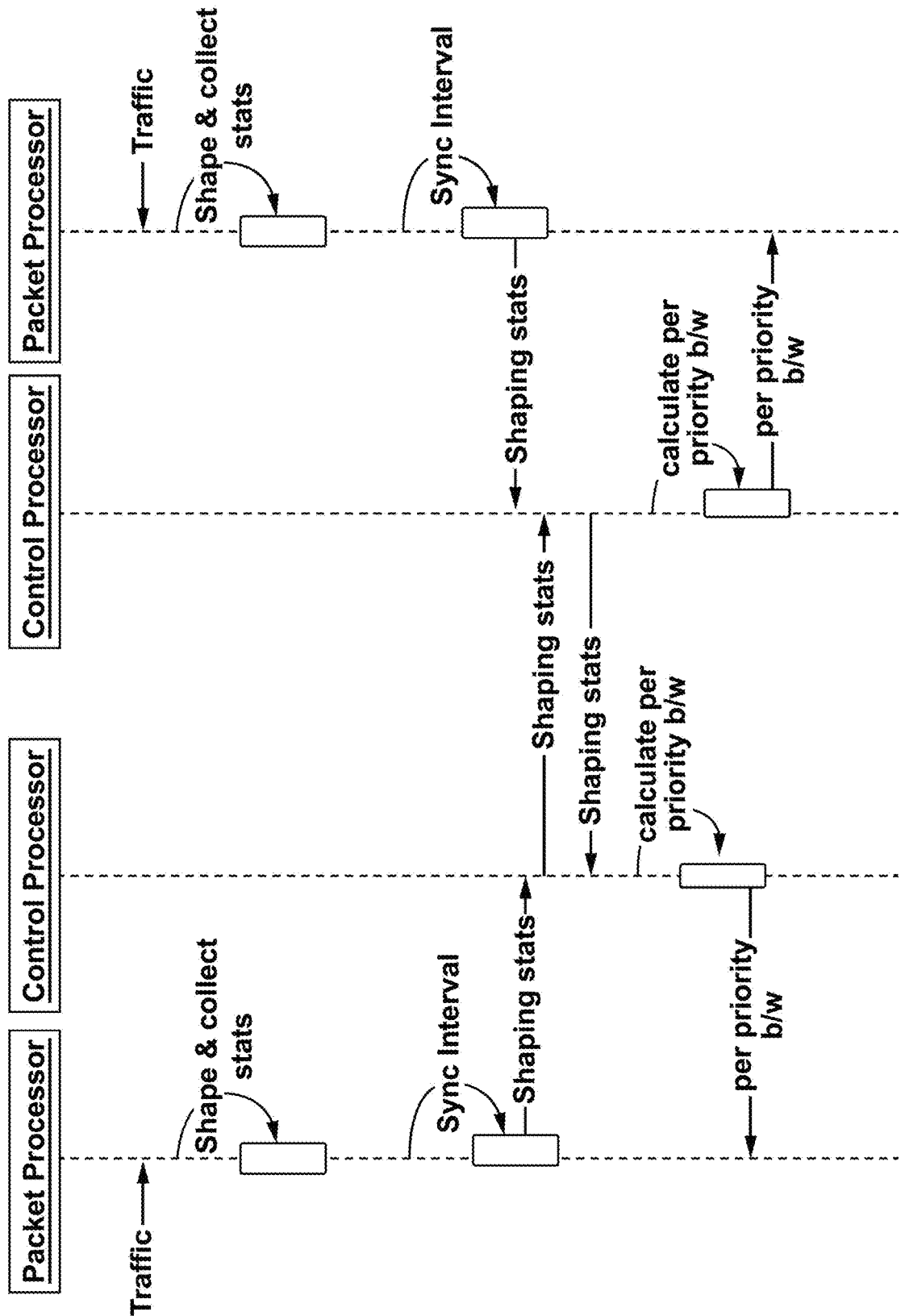
FIG. 8 is a sequence diagram for a method for prioritizing network traffic via distributed shaping according to another embodiment.

- Receive per priority input information at local Node from all the Nodes in the cluster
//Calculate priority wise b/w demand across cluster
Sum(PX) = PXi + PXj + PXk ..... where X is priority and i,j, k .are Node instances
//Calculate total Priority traffic that can be satisfied throughout cluster
Available_BW = total_Interval_bw
for x in all Priority
do
   Px = Available_BW − Sum(Px) > 0 ? Sum(Px) : Available_BW
   Available_BW = Available_BW − Px
Done
//Calculate local bw for next interval
For all Px > 0
do
   next_budget_X += (Px_local/Sum(Px))*(Px)
done In a further example, FIG. 8 illustrates a sequence diagram for a method for distributed shaping for a Shaper Object with Weighted Fair Queue Configuration, according to an embodiment. When a shaper is configured with weights per priority, the shaper is configured to use such weights and the sum total of all weights is intended to be 100%. It is possible to configure 0% as weights for some priorities as long as 100% weights are configured among other priorities. In this example, the Shaper Object may be configured to maintain the allocation for a given priority as per the weights configuration. In case demand for a priority is less than the weight configured, the spare bandwidth may be distributed to the other priorities where demand is more than their respective configured weights. If spare bandwidth is still available (due to, for example, weak demand), remaining bandwidth may be allocated to all priorities in precedence of weights.

In this example, the Control Processor 110 may initially determine a bandwidth to each priority based on the configured weight and rate for a sync interval and may store and update each Shaper Object 115 at each local and associated Logic module 125. When traffic is received at the Logic node, the Packet Processor 105 associated with the Logic node 125 may parse the traffic. The Packet processor 105 may determine if the traffic should be processed by a shaper object. If yes, then the Packet Processor 105 may determine what the priority may be of the traffic. Once the shaper object 115 and traffic priority is determined, the Packet Processor 105 queues the packets to the respective priority queue of identified shaper objects.

At every sync interval, the shaper object 115 may iterate through each priority queue in the order of precedence (for example, from highest priority to lowest priority). The shaper object 115 may drain the queue based on per queue allocation updated by the control plane. During this time period, the Logic module 125 determines the demands per priority. At the end of interval, the collected traffic flow parameters may be sent to Control Processor 110.

Message: Shaper_Utilization_Details
From: Shaper Object
To: Control Processor
Contents:

| P1: demand | P2: demand | P3: demand | ... | ... | ... | Pn: demand |
|---|---|---|---|---|---|---|

The Control Processor 110 may be configured to store this information, for example, locally in a memory component, and may forward the information to each of the other Control Processor operating associated with Logic modules of the cluster via, for example, UDP protocol.

For every Sync Interval, the Control processor 110 may read and store the per priority demand received from each of the Control Processors 110 in the cluster. Each control processor 110 may determine the bandwidth that can be allocated to the shaper object at Packet Processor 105 running and the new weights per priority to be used by at this Logic. Bandwidth per priority for local Logic module and new weights per priorities may be sent to the Packet Processor where the shaper object will use them to shape the traffic:

Message: Shaper_Allocation_Details
From: Control Processor
To: Shaper Object
Contents:

| P1: Bandwidth, weight | P2: Bandwidth, weight | ... | ... | Pn: Bandwidth, weight |
|---|---|---|---|---|

Figure 9:
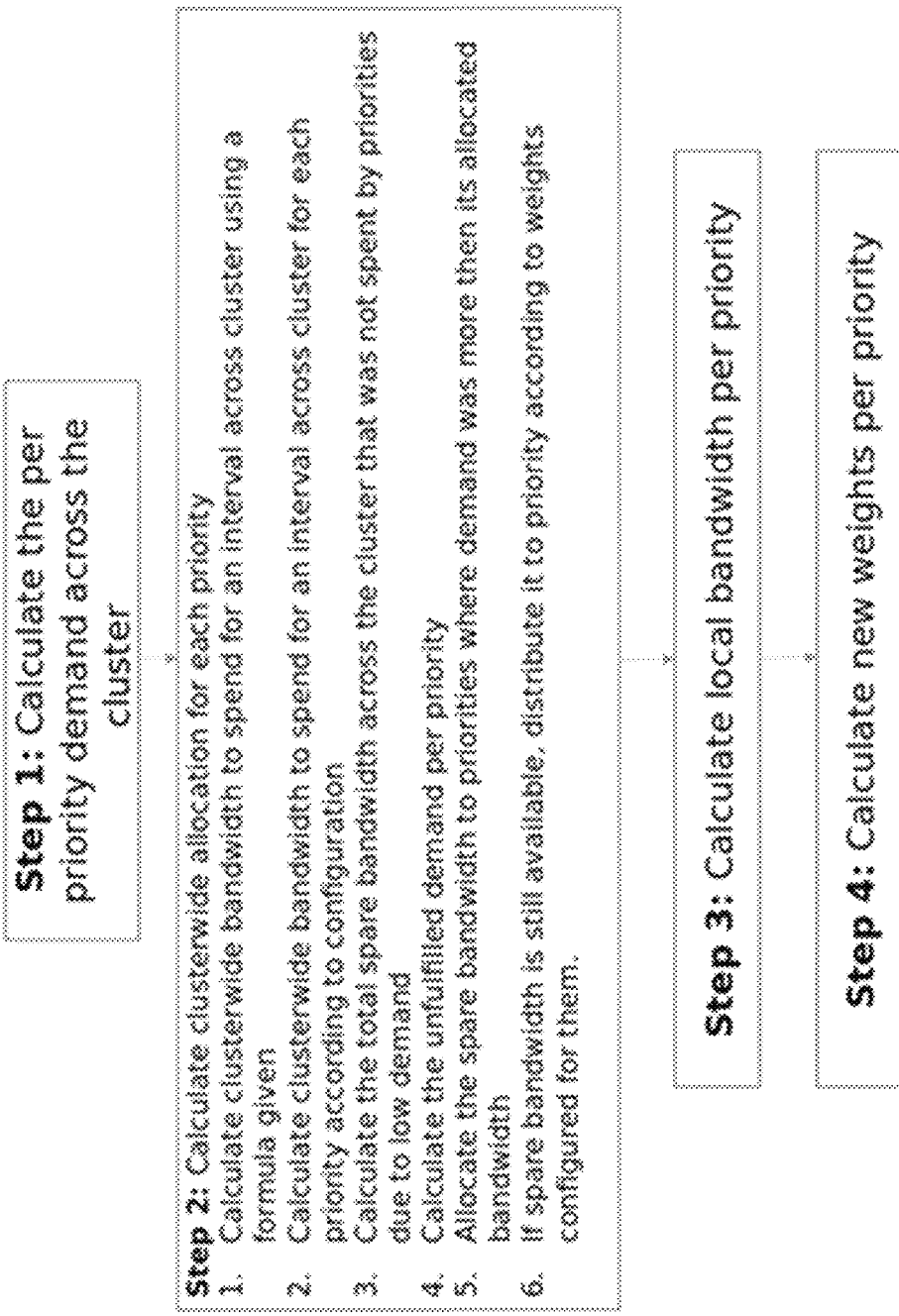
FIG. 9 is a flow chart for a method for prioritizing network traffic via distributed shaping according to another embodiment.

FIG. 9 illustrates another embodiment of a method for prioritizing network traffic via shaping using weighted queue priority in a distributed environment. At 905, the control processor may determine the per priority demand across the cluster by aggregating (for example, by summing) the information received by each Logic including what may be received from the local Shaper Object.

At 910, the control processor may determine a clusterwide allocation for each priority, First, the control processor may determine a clusterwide bandwidth to spend for an interval across cluster using, for example: total_Interval_bw=(configured_bandwidth/1000)*interval. The control processor 110 may then determine clusterwide bandwidth to spend for an interval across cluster for each priority according to configuration, by using for example: interval_bw_prio_x=(total_Interval_bw*weight_x)/100. Further, the total spare bandwidth (total_spare_bw) across the cluster that was not spent, by priorities due to low demand may be determined. The Control Processor may also determine any unfulfilled demand per priority (excess_demand_x) (dropped traffic for priority due to unavailability of the bandwidth for that priority). The Control processor 110 may also allocate the spare bandwidth to priorities where demand was more than its allocated bandwidth. This may be done as follows:

interval_bw_prio_x=interval_bw_prio_x+Min (excess_demand_x, total_spare_bw)
total_spare_bw=total_spare_bw−Minimum (excess_demand_x, total_spare_bw)

If spare bandwidth is still available, each Control Processor 110 may distribute this to priority according to weights configured for them.

interval_bw_prio_x=interval_bw_prio_x+ total_spare_bw*weight_x/100
total_spare_bw=total_spare_bw− total_spare_bw*weight_x/100

At 915, the control processor 110 may be configured to determine local bandwidth per priority at local node and total bandwidth at local node using for example:

local_bw_prio_x=(local_demand_for_priority_x/total_demand_across_cluster)*interval_bw_prio_x
net_local_bw=net_local_bw+local_bw_prio_x.

Further, at 920, the control processor 110 may determine new weights per priority (based on new allocation per priority) using for example: New_weight_for_X=(net_budget_for_prio_X/total_net_budget)*100.

In particular, if a priority does not have sufficient traffic flow to consume the full weight of the bandwidth associated with the priority, the excess bandwidth is intended to be provided to the other priority levels. A specific example of the possible pseudocode is shown below.

```
Prediction at every Logic Control Processor
//Calculate priority wise b/w demand across cluster
Sum(PX) = PXi + PXj + PXk ..... where X is priority and i,j, k .are Logic instances
// Calculate clusterwide available bandwidth for each priority
For X in priorities
do
    weighted_allocation_for_prio_X = (total_interval_bw * weight)/100
done
//Calculate unutilized bandwidth
Spare_bw = 0
For X in priorities calculate
    Spare_bw = Spare_bw + Max ( weighted_allocation_for_prio_X − Sum(PX), 0)
//Calculate bandwidth demand in addition to configure bandwidth
extra_demand_for_prio_X = 0
For X in priorities calculate
    extra_demand_for_prio_X = Max ( Sum (Px) − weighted_allocation_for_prio_X, 0)
//Allocate the spare bandwidth to priorities where demand is more then configured/
Adjust the configured allocation if demand is weak
While (Spare > 0 and all priorities are traversed)
do
    extra_alloc = Min ( extra_demand_for_prio_X,  Spare_bw)
    Spare_bw = Spare_bw − extra_alloc
    if (extra_alloc > 0)
        weighted_allocation_for_prio_X = weighted_allocation_for_prio_X + extra_alloc
    else if (Sum (Px) < weighted_allocation_for_prio _X)
        weighted_allocation_for_prio_X = Sum (Px)
done
```

```
// If there is still bandwidth available distribute it among priorities according to
weight
if (Spare_bw > 0)
  For X in priority
  do
      extra_alloc = Spare_bw * weight_x/100
      Spare_bw = Spare_bw - extra_alloc
      weighted_allocation_for_prio_X = weighted_allocation_for_prio_X + extra_alloc
done
// Calculate per priorities allocation at local Logic
For all Px > 0
do
    next_budget_for_prio_X += (Px_local/Sum(Px))*(weighted_allocation_for_prio_X)
    total_net_budget += next_budget_for_prio_X
done
// Calculate the new weights for each priority for local Logic
For all Px > 0
do
New_weight_for_X = (net_budget_for_prio_X / total_net_budget) * 100
done
```

In this example, spare bandwidth across cluster may be determined based on sync information from the nodes in the cluster. This spare bandwidth is then allocated to all nodes which requires excess bandwidth than what has previously been allocated to these nodes. This allocation may be completed based on the weight and priority.

If there remains further spare bandwidth, the spare bandwidth may be allocated to each priority based on demand. Once additional bandwidth has been allocated to each priority weights per priority for a given interval, the bandwidth may be recalculated based on the total bandwidth allocated to priority on that node. These new weights may be passed to or retrieved by the packet processing node.

In the preceding description, for purposes of explanation, numerous details are set forth in order to provide a thorough understanding of the embodiments. However, it will be apparent to one skilled in the art that these specific details may not be required. It will also be understood that aspects of each embodiment may be used with other embodiments even if not specifically described therein. Further, some embodiments may include aspects that are not required for their operation but may be preferred in certain applications. In other instances, well-known structures may be shown in block diagram form in order not to obscure the understanding. For example, specific details are not provided as to whether the embodiments described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with other modules and elements, including circuitry or the like, to perform the described tasks.

The above-described embodiments are intended to be examples only. Alterations, modifications and variations can be effected to the particular embodiments by those of skill in the art without departing from the scope, which is defined solely by the claim appended hereto.

What is claimed is:

1. A system for prioritizing network traffic in a network, which includes a plurality of traffic flows flowing through the network, the system comprising:
   a plurality of logic modules distributed within the network and configured to receive policy data as well as the plurality of traffic flows, each logic module comprising:
   a control processor configured to communicate with control processors in others of the plurality of logic modules;
   a packet processor configured to receive at least some of the plurality of traffic flows and, with the control processor, determine traffic data for each of the traffic flows, assign priority to each of the traffic flows based on the traffic data, and determine a traffic action for each of the traffic flows based on the received policy data and the assigned priority; and
   at least one shaper object configured to receive the determined traffic action from the packet processor and enforce the determined traffic action on each of the traffic flows, wherein the control processor is configured to determine available bandwidth for the plurality of logic modules based on the aggregated bandwidth for each priority of the plurality of traffic flows from each of the plurality of logic modules and the packet processor is configured to also determine the traffic action based on the available bandwidth.

2. The system according to claim 1, wherein the available bandwidth is allocated by each of the plurality of logic modules based on the priority of the traffic flows.

3. The system according to claim 1, wherein each assigned priority level is provided a weight with regard to an amount of the available bandwidth to be allocated to that priority.

4. The system according to claim 3 wherein each assigned priority is provided a weight greater than zero.

5. The system according to claim 3 wherein if a priority does not use the amount of available bandwidth allocated to that priority, the weight is recalculated.

6. The system according to claim 1, wherein each logic module further comprises at least one traffic classification engine configured to classify the traffic flow based on traffic parameters.

7. The system according to claim 1, wherein each control processor is configured to determine available bandwidth for the plurality of logic modules based on the aggregated priority of the plurality of traffic flows from each of the plurality of logic modules at a predetermined sync interval.

8. A method for prioritizing network traffic in a network, which includes a plurality of traffic flows flowing through the network, the method comprising:
- receiving policy data at a plurality of logic modules distributed within the network;
- determining traffic data for each of the traffic flows, assigning priority to each of the traffic flows based on the traffic data, and determining a traffic action for each of the traffic flows based on the received policy data and the assigned priority;
- enforcing the determined traffic action by at least one shaper object associated with each of the plurality of logic modules; and
- determining available bandwidth for the plurality of logic modules based on the aggregated bandwidth for each priority of the plurality of traffic flows from each of the plurality of logic modules and also determining the traffic action based on the available bandwidth.

9. The method according to claim 8, wherein the available bandwidth is allocated by each of the plurality of logic modules based on the priority of the traffic flows.

10. The method according to claim 9, wherein the assigned priority of each of the traffic flows is provided a weight with regard to the amount of the available bandwidth to be allocated to that priority.

11. The method according to claim 10 wherein the priority of each of the traffic flows is assigned a weight greater than zero.

12. The method according to claim 10 wherein if any priority of each of the traffic flows does not use the amount of available bandwidth allocated to that priority, the weight is recalculated.

13. The method according to claim 8 further comprising classifying each traffic flow based on traffic parameters.

14. The method according to claim 8, wherein the determining available bandwidth for the plurality of logic modules based on the aggregated bandwidth for each priority of the plurality of traffic flows from each of the plurality of logic modules occurs at a predetermined.

* * * * *